Feb. 23, 1932.    A. H. ADAMS    1,846,665
CONVEYER BELT CENTERING MECHANISM
Filed April 13, 1928
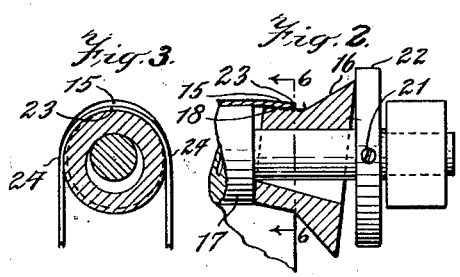
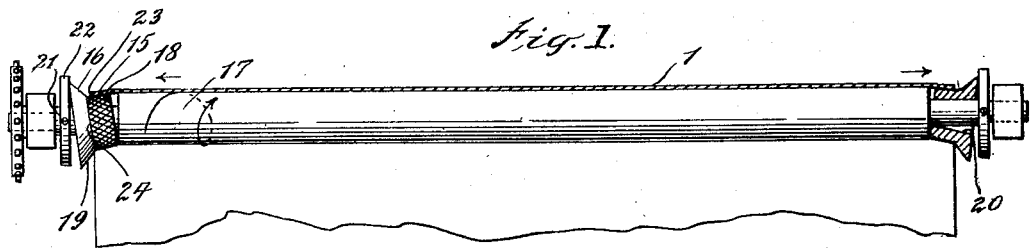
ARTHUR H. ADAMS
*INVENTOR.*
BY Paul Telich
*ATTORNEY*

Patented Feb. 23, 1932

1,846,665

UNITED STATES PATENT OFFICE

ARTHUR H. ADAMS, OF LA GRANGE, ILLINOIS, ASSIGNOR TO TROY LAUNDRY MACHINERY COMPANY, INC., OF NEW YORK, N. Y., A CORPORATION OF DELAWARE

CONVEYER BELT CENTERING MECHANISM

Application filed April 13, 1928. Serial No. 269,853.

This invention relates to belt centerers or stretchers, particularly for belts used for conveying clothes into a laundry ironing machine, and known as aprons.

It is an object of the invention to provide means for keeping a belt, or laundry apron, smooth and properly centered on its driving pulleys.

In carrying out my invention I provide a friction mechanism such as a pair of rollers, or a single roller, set at an angle to the path of travel of the belt and in contact therewith, the roller or rollers being placed at such position relative to the belt so as to be rotated by the belt and to cause the belt to be properly centered on its pulleys and stretched flat.

Other objects and advantages of the invention and the manner of attaining them will be made clear in the following description taken in conjunction with the drawings.

In the drawings,

Fig. 1 is a plan view partly in section of a belt tightening mechanism constructed in accordance with my invention.

Fig. 2 is a detail view of a portion of the mechanism of the belt tightening arrangement shown in Fig. 1.

Fig. 3 is a view taken along line 3—3 of Fig. 2.

Referring more particularly to the drawings, reference numeral 1 indicates a thin belt or laundry apron, the edges of which pass over rollers 16.

As shown in Figure 1, the sheet 1 is carried over a pulley 17 which may be either a special pulley for the belt stretching device or any pulley over which the belt 1 passes at any considerable angle. The edge 15 of the sheet projects by the end of the pulley 17 and rests upon the friction gripping surfaces 18 of the roller 16. The roller 16 comprises the friction gripping portion 18 terminating in a polished relatively sharply tapering portion 19. The friction gripping portion 18 also tapers in the same direction as the polished portion 19 but at a lesser angle. The entire roller 16 has a frustro-conical perforation 20 through which projects the shaft 21 of the pulley 17. Due to the shape of the frustro-conical perforation 20 the entire roller 16 sets at an angle to the shaft 21, being held in this angle by the tension of the belt 1. In order to hold the roller 16 in its operating position a collar 22 is keyed to the shaft 21.

The operation of the device is as follows:

When the belt 1 is properly centered on the pulley 17 friction gripping surface 18, being disposed at an angle to the path of travel of the belt, tends to stretch the belt as it approaches and passes over the friction gripping surfaces 18, in the direction shown by the arrows. This is because the belt on touching the friction gripping surface 18, due to the friction thereof, is in effect tightly fixed to the gripping surface and carried by the said surface in its path of travel, which has a component longitudinally of the pulley 17 in an outward direction. Should the belt 1 move away from center toward one of the rollers 16, say the roller at the left in Fig. 1, the edge 15 of the belt will engage the polished tapering portion 19, be thrust up the side thereof, thus drawing the edge 15 of the sheet partially out of contact with the friction gripping surface 18 or at least reducing the pressure on the further surface, thereby reducing the drawing action of the said friction gripping surface, and permitting the belt to be drawn to the right under the influence of the other stretching arrangement. Should the belt 1 tend to travel to the right the action would be carried out in similar manner and the sheet drawn to the left under the action of the left-hand stretching mechanism.

It should be noted that in order to prevent stretching of the edge 15 of the belt 1, due to the wrapping of the outer edge of the belt around the enlarged portion of the gripping surface 18, adjacent to the polished portion 19, during normal operation of the device, that the frustro-conical perforation 20 is made with such a taper as to permit a portion of the edge of the belt 15 to draw in around the gripping surface 18 at a lesser radius than that of pulley 17, as shown at 23. The slack gained in the belt at the point 23 is taken up by the greater effective radius at the point of initial and final contact 24, of the belt on the pulley 16. This feature of the invention is indicated most clearly in Fig. 3.

The friction gripping surface 18 may be of rubber or cork or may be merely a knurled or suitably roughened surface, while the portion 19 may be of material such as polished steel, glass or the like, selected to give as little friction with the edge of the belt as possible.

If the belt 1 is of extremely thin material and not suitable either to withstand the abrasive effect incident to contact with the gripping surface 18, the edge 15 of the belt may be made of heavier material more suitable for the operating conditions.

It will be seen that a device constructed in accordance with my invention provides a very simple and efficient means for maintaining a belt in a smooth and tight condition without undue wear on the operating portions of the belt.

While I have disclosed a particular embodiment of my invention for the purpose of illustration, it is to be understood that such various modifications and adaptations as would occur to one skilled in the art, may be made without a departure from the spirit of the invention as set forth in the appended claims.

What I claim is:

1. In a belt centering device, a pulley and a roller mounted adjacent each end of the pulley and in alignment therewith, said roller having a friction surface for normally engaging the edge of the belt and a non-friction inclined surface adjacent the outer end of said friction surface.

2. In a belt centering device, a roller mounted with its axis at an angle of less than 90° on the edge of the belt, said roller having a friction surface and a tapered non-friction surface adjacent thereto, the said friction surface normally engaging the edge of the belt and said non-friction surface serving to lift the belt away from the friction surface upon predetermined movement of the belt toward the said roller.

3. In a belt centering device, a pulley, said pulley having a shaft projecting from one end thereof and a roller, said roller having a tapered opening therein within which the said shaft is positioned, said roller having a friction surface adjacent to the said pulley and an inclined non-friction surface away from said pulley.

4. In a belt centering device, a pulley over which the belt passes, a friction roller element adjacent the said pulley and mounted at an angle thereto, and a tapered non-friction roller element mounted adjacent to the end of said friction roller away from said pulley.

5. A belt centering device according to claim 4 wherein the friction roller has an external taper and is provided with a perforation having a similar and greater taper, the friction roller being mounted on a shaft with its small end towards the pulley.

6. In a belt centering device, a pulley over which the belt passes and roller means mounted at an angle to the axis of said pulley comprising a friction surface and an inclined polished surface, in alignment with the said pulley and adjacent each end thereof, for smoothing and centering the said belt.

In testimony whereof, I have signed my name to this specification this 9th day of April, 1928.

ARTHUR H. ADAMS.